Figures 1, 2:
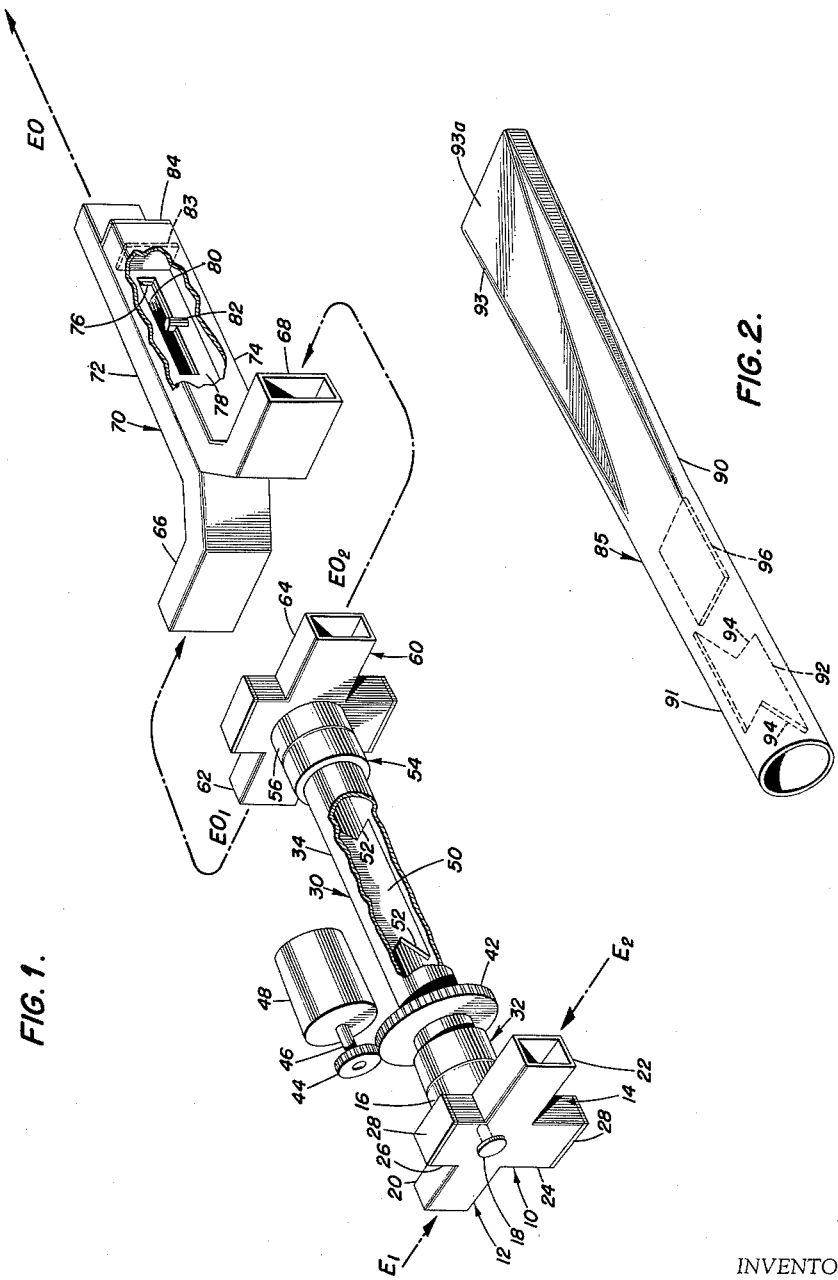

Sept. 19, 1961 G. W. LUKE, JR 3,001,153
MICROWAVE PHASE SHIFTER
Filed July 13, 1954

INVENTOR
GEORGE W. LUKE, JR.
BY
ATTORNEYS

3,001,153
MICROWAVE PHASE SHIFTER
George W. Luke, Jr., Rockville, Md., assignor to the United States of America as represented by the Secretary of the Navy
Filed July 13, 1954, Ser. No. 443,184
6 Claims. (Cl. 333—31)

The present invention relates to apparatus for transmitting or receiving microwave energy. More particularly, it relates to an improved microwave phase shifter.

Microwave phase shifters find application in missile guidance systems; for example, they are sometimes used in homing systems, power dividing networks, and radar guidance systems. In some of these applications, they perform the function of shifting the angular position of a beam of electromagnetic energy. A specific instance is in the interferometer homing system described in patent application Ser. No. 111,313, entitled, "Radar System for Determining the Relative Direction of Two Objects Moving in Space," filed August 19, 1949, Otto J. Baltzer, inventor. This homing system includes a receiver located on the missile and having connected thereto a first pair of spaced antennas mounted in a horizontal plane for steering in azimuth and a second pair mounted in a vertical plane for steering in elevation. The antennas of each pair are separated in space by a distance which corresponds to a fixed integral number of wave lengths of the microwaves being received, and have their outputs combined and fed to a detector in the missile receiver. This arrangement results in an interference pattern between the signals received by the two antennas of each pair. The interference pattern comprises a number of apparent lobes or fringes of electromagnetic energy in space and, to make detection of target motion possible, the lobes are caused to scan at a constant frequency by a continuous phase shifter inserted in the waveguide connected to one of said antennas of each pair.

The present invention provides a phase shifter which is particularly suitable for, but not limited to, use with interferometer homing systems. A typical prior art phase shifter of this type comprises an input transition for converting a plane polarized $TE_{1,0}$ wave into a circularly polarized wave, a circular waveguide connected to the transition and having a rotating section with a dielectric plate fitted therein, and an output transition element for reconverting the circularly polarized wave to a plane polarized wave in the $TE_{1,0}$ mode. The section including the dielectric plate is rotated at a constant angular rate by a suitable motor, thereby changing the velocity of one component of the circularly polarized wave with respect to the other component of said wave. When the components of the wave are recombined in the output transition, the phase has been shifted two cycles per revolution of the rotating section. This prior art phase shifter has been used to generate the scan frequency of the interferometer homing system.

Accordingly, an object of the present invention is to provide an improved continuous phase shifter for use in microwave transmission systems.

It is a further object of the present invention to provide a continuous phase shifter that will accurately provide scanning at a constant rate.

A more specific object of the present invention resides in the provision of a phase shifter having means for doubling the scan frequency generated for a given motor speed.

Another object of the invention resides in the provision of a phase shifter which is rugged and compact, and suited particularly for use in missile waveguide systems.

Other objects and many of the attendant advantages of this invention will be readily appreciated as the same becomes better understood by reference to the following detailed description, when considered in connection with the accompanying drawings, wherein:

FIG. 1 is a perspective view, with parts broken away, of the phase shifter of the present invention; and FIG. 2 is a perspective view of a modified form of one of the components of the phase shifter shown in FIG. 1.

Briefly, the present invention provides for the projecting of two plane polarized microwave signals of $TE_{1,0}$ mode into an input transition element by which they are converted into circularly polarized waves with opposite senses of circular polarization. These waves are propagated down a circular waveguide having a rotatable section containing means for producing a change in the velocity of propagation for one component of each circularly polarized wave. The phase of one wave is continuously advanced by said rotating section whereas the phase of the other wave is continuously retarded. The waves are then delivered to an output transition, which reconverts them into plane polarized waves of $TE_{1,0}$ mode. After reconversion, the waves are fed by suitable waveguide connections to a coupler and combined. The output of the coupler, as detected by a crystal, is a modulated radio frequency wave train with a modulation frequency equal to four times the frequency of rotation of the section of circular waveguide in radians per second.

In an alternative arrangement, the two circularly polarized waves are coupled into a circular-to-rectangular waveguide transition after passing through a rotatable section. This transition contains a dielectric plate suitable for converting the waves to plane polarization; an attenuating card being provided in the circular waveguide for attenuating any component of the wave normal to the dielectric plate.

Referring to FIG. 1 of the drawing, the invention is shown as comprising an input transition element 10, known as a turnstile junction, consisting of a pair of intersecting rectangular waveguides 12 and 14, a circular waveguide 16 coupled to their junction, and an impedance matching element 18 positioned near the junction. The transition element 10 is of a conventional type and a detailed description thereof may be found in the publication entitled, "Microwave Transmission Circuits," by George L. Ragan, at pages 375 et seq. The waveguide 12 comprises two input arms 20 and 22 to which plane polarized microwave signals $E_1$ and $E_2$, respectively, of $TE_{1,0}$ mode, are supplied. The waveguide 14 comprises arms 24 and 26, the latter being $$\frac{\lambda}{4}$$

($\lambda$ being the wavelength in the waveguide) shorter than the former, and both arms 24 and 26 being terminated by short circuiting plates 28. When the matching element 18 and the arms 24 and 26 are properly dimensioned, the transition element 10 converts each of the input waves $E_1$ and $E_2$ into a circularly polarized wave. As a result, two circularly polarized waves with opposite senses of circular polarization are propagated independently through the circular waveguide section 16.

A rotatable section of circular waveguide, generally indicated by reference numeral 30, is coupled to the circular waveguide section 16 by a rotating joint 32 which includes suitable choke sections to limit stray radiation. The rotatable section 30 comprises a circular waveguide 34 which may be supported in spaced mounting posts attached to a base plate (not shown). A ring gear 42 is carried on the outer surface of the waveguide 34 and is arranged to mesh with a driving gear 44 carried on the shaft 46 of an electric motor 48.

A conventional phase shifting element in the form of a half-wave dielectric plate 50 is press fitted inside the circular waveguide 34 along a diametral longitudinal plane thereof. The use of a dielectric plate as a phase shifter is disclosed in detail in United States Patent No. 2,599,753, issued June 10, 1952, to A. G. Fox. The half-wave dielectric plate 50 is provided with suitable notches 52 at each end for matching purposes. In general, the length and thickness of the dielectric plate 50 are determined experimentally.

The other end of waveguide section 34 is coupled by a second rotating joint 54 into the circular waveguide section 56 of an output transition element 60 which is identical in construction with the input transition 10. Two output waves, shown diagrammatically at $EO_1$ and $EO_2$ and corresponding to the input waves $E_1$ and $E_2$, appear at arms 62 and 64, all respectively, of the transition element 60. These output waves are directed, by suitable waveguides (not shown), into right angle waveguide bends 66 and 68 which are part of a slot coupler 70.

The slot coupler 70 comprises a pair of waveguide sections 72 and 74 having contiguous side walls, 76 and 78. A resonant window 80 is provided in the walls 76 and 78, and an impedance matching stub 82 is positioned in said resonant window. The two inputs, $EO_1$ and $EO_2$, to waveguide sections 72 and 74, respectively, will be combined by the resonant window, and a single output will appear in waveguide 72 as indicated by the arrow EO. A load in the form of a card 83 of lossy material is inserted in waveguide 74, between the window 80 and a short circuiting plate 84 which terminates said waveguide.

In summarizing the operation of this form of the invention, the two plane polarized input waves, $E_1$ and $E_2$, of $TE_{1,0}$ mode are supplied to the arms 20 and 22 of the waveguide 12. By the action of transition 10, these waves are converted into circularly polarized waves with opposite senses of circular polarization and are radiated into the circular waveguide section 16 and thence to rotatable circular waveguide section 34. The circularly polarized waves can each be regarded as being made up of two plane polarized waves separated in time phase by 90°, the planes of polarization of which are separated in space by 90°. Thus, each circularly polarized wave may be regarded as having one component in which the electric field is parallel to the dielectric plate 50, and a second component in which the electric field is perpendicular to said plate. Due to the change in the velocity of the parallel component of each circularly polarized wave as it passes through plate 50, with respect to the velocity of the perpendicular component of each wave, the phase of one wave is continuously advanced by rotation of the circular waveguide section 34 in one direction, while the phase of the other wave is continuously retarded.

The output transition element 60 transforms the circularly polarized waves into two polarized plane waves shifted in phase with respect to the plane polarized waves by an amount which is proportional to the angle through which the circular waveguide section 34 has been rotated. The waves are then combined in the slot coupler 70 providing an output which, detected by a crystal, is a modulated radio frequency wave train with a modulation percentage proportional to the coupling coefficient of the slot coupler and a modulation frequency equal to four times the frequency of the rotation of circular waveguide section 34 in radians per second.

In FIG. 2, there is shown an alternate arrangement of the apparatus for combining the two waves from the rotatable waveguide section 34. With this arrangement the modulation percentage can be set at any desired value. This embodiment comprises a transducer generally indicated by reference numeral 85, which includes a circular to rectangular waveguide transition 90 comprising a circular portion 91 tapered to a rectangular portion 93. A quarter-wave plate 92 of dielectric, vertically disposed with respect to top and bottom walls 93a of the rectangular portion 93, is press fitted in place near one end of the circular portion 91 of transition 90, along a diametral longitudinal plane of said circular portion. As is conventional, the dielectric plate 92 is provided with notches 94 at each end thereof for matching purposes. A dissipative type attenuator 96, which may be of the resistor strip type, is also fitted into the circular waveguide section 91, normal to the dielectric plate 92. The device shown in FIG. 2 may be substituted for the turnstile junction 60 and the slot coupler 70 of FIG. 1.

In the operation of this embodiment of the device, the two circularly polarized waves from the round waveguide 34 are coupled into the circular waveguide section of the transition 85. The quarter-wave plate 92 converts the two waves from circular to plane polarization. The attenuator 96 attenuates any component of the waves normal to the dielectric plate 92 and the waves combine with a modulation frequency proportional to the frequency of rotation of the circular waveguide 34 in radians per second. The modulation is 100% with the attenuating card 96 and the dielectric plate 92 at right angles to each other. However, in this embodiment of the invention, the modulation percentage can be set at any desired value by rotating the dielectric plate 92 through some fixed angle with respect to the rectangular waveguide portion of transition element 85.

Obviously, many modifications and variations of the present invention are possible in the light of the above teachings. It is therefore to be understood that within the scope of the appended claims the invention may be practiced otherwise than as specifically described.

What is claimed is:

1. A microwave phase shifter, comprising a rotatable section of circular waveguide, means for continuously rotating said section, means connected to said section at one end thereof for radiating two microwave signals having opposite senses of circular polarization into said section, means in said section for producing an advance in phase of one of said signals and a delay in phase of the other of said signals as said section is rotated, and means combining the signals altered in phase thereby providing a single amplitude modulated signal having a modulation frequency fourfold the frequency of rotation of said circular waveguide section.

2. A microwave phase shifter as claimed in claim 1, wherein a transition element is connected to the other end of said section for converting said circularly polarized signals into plane polarized signals, and the combing means is a slot duplexer to which said plane polarized signals are fed.

3. A microwave phase shifter as claimed in claim 1, wherein the combining means includes a circular to rectangular waveguide transition connected to the other end of said section, means in said transition for converting circularly polarized waves into plane polarized waves, and an attenuator positioned in said waveguide at an angle to said last-named means.

4. A microwave phase shifter, comprising a rotatable section of circular waveguide, means for continuously rotating said section, means connected to one end of said section for radiating two microwave signals having opposite senses of circular polarization into said section, means in said section for producing an advance in the phase of one of said circularly polarized signals and a delay in the phase of the other of said signals as said section is rotated, means connected to the other end of said section for converting said circularly polarized waves into plane polarized waves, and means for combining said plane polarized waves thereby providing a single amplitude modulated signal having a modulation frequency fourfold the frequency of rotation of said circular waveguide section.

5. A microwave phase shifter, comprising a rotatable section of circular waveguide, means for continuously rotating said section, a first turnstile junction connected to one end of said section for radiating two microwave signals having opposite senses of circular polarization into said section, a half-wave dielectric plate positioned in said section for producing an advance in phase of one of said signals and a delay in phase of the other of said signals as said section is rotated, a second turnstile junction connected to the other end of said section for converting said circularly polarized waves into plane polarized waves, and a slot duplexer for combining said plane polarized waves thereby providing a single amplitude modulated signal having a modulation frequency fourfold the frequency of rotation of said circular waveguide section.

6. A microwave phase shifter, comprising a rotatable section of circular waveguide, means for continuously rotating said section, a turnstile junction connected to one end of said section for radiating two microwave signals having opposite senses of circular polarization into said section, a half-wave dielectric plate positioned in said section for producing an advance in phase of one of said signals and a delay in phase of the other of said signals as said section is rotated, a circular to rectangular waveguide transition connected to said section at the end remote from said turnstile junction, a quarter-wave dielectric plate in said transition for converting the circularly polarized waves to plane polarized waves, and an attenuator positioned in said waveguide at an angle to said quarter-wave plate.

References Cited in the file of this patent

UNITED STATES PATENTS

| | | |
|---|---|---|
| 2,425,345 | Ring | Aug. 12, 1947 |
| 2,530,818 | Fox | Nov. 21, 1950 |
| 2,607,849 | Purcell | Aug. 19, 1952 |
| 2,683,855 | Blitz | July 13, 1954 |
| 2,686,901 | Dicke | Aug. 17, 1954 |